Feb. 25, 1958  G. KLEMT  2,824,495
WIDE-ANGLE PHOTOGRAPHIC AND CINEMATOGRAHIC OBJECTIVE
Filed July 3, 1956
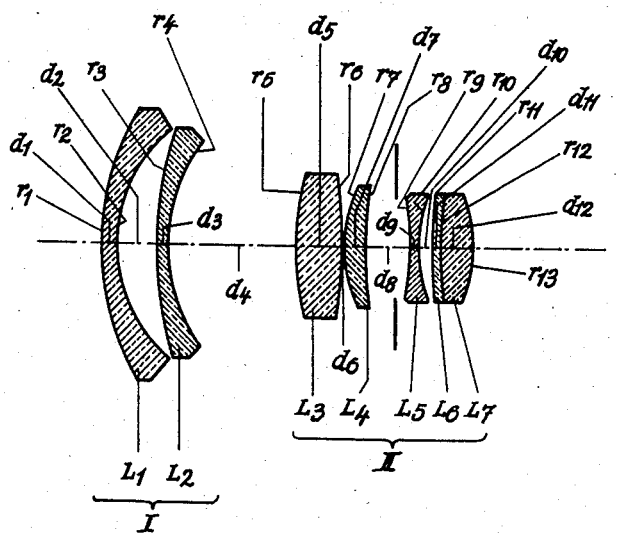
INVENTOR:
Günter KLEMT
BY
Karl F. Ross
AGENT

United States Patent Office 2,824,495
Patented Feb. 25, 1958

2,824,495

WIDE-ANGLE PHOTOGRAPHIC AND CINEMATOGRAPHIC OBJECTIVE

Günter Klemt, Kreuznach, Germany, assignor to Jos. Schneider & Co., Kreuznach, Rhineland, Germany Application July 3, 1956, Serial No. 595,643

Claims priority, application Germany July 5, 1955

2 Claims. (Cl. 88—57)

My present invention relates to an optical objective system, for photographic or cinematographic apparatus, having a wide angle of view.

An object of this invention is to provide a wide-angle objective having a very large image distance so as to be suitable for use in apparatus with special structural requirements, such as conventional reflex-type cameras.

Another object of this invention is to provide an objective of the character just described, and of large relative aperture, whose performance is improved by a substantial flattening of its astigmatic zones or shells.

High-speed objective systems with a wide angle of view and a relatively large image distance can be realized by means of a positively refracting four-member lens group, wherein a biconcave lens and three collective components are so arranged that two of these components are positioned forwardly of this lens, i. e. toward the side of the longer light rays, while the third component is positioned rearwardly thereof, this group being preceded by a system having the form of an inverted telephoto attachment and consisting of two negatively refracting menisci. In accordance with a feature of this invention, the collective component immediately preceding the biconcave lens is designed as a positively refracting meniscus, with distinctly curved faces, turning its concave side toward the biconcave lens and consisting of a glass with a very low index of refraction, such as an index less than 1.50 for the yellow helium line of the spectrum.

A further object of the present invention is a reduction of residual coma in a system as set forth above. This is accomplished, according to another feature of my invention, by realizing the rear collective component (i. e. the one which faces the image plane) as a compound member cemented from two lenses of high refractive power, the refractive indices of these two lenses for the yellow helium line preferably satisfying the condition that their sum be greater than 3.3 and their difference less than 0.01, the more forwardly positioned one of these lenses having the greater refractivity.

According to still another feature of this invention, the total axial length of the system (computed as the sum of all air spaces and lens thicknesses) is approximately equal to the image distance which latter, in turn, is greater than five-fourths of the overall focal length; the air space between the dispersive front group and the collective rear group is at the same time around one-third of this axial length.

The invention will be described in greater detail with reference to the accompanying drawing whose sole figure illustrates, schematically, a preferred embodiment.

The sole figure of the drawing shows a dispersive front group I followed by a collective rear group II. Group I consists of a first ngative meniscus $L_1$, whose radii are $r_1$, $r_2$ and whose thickness is $d_1$, and of a second negative meniscus $L_2$ whose spacing from lens $L_1$ is designated $d_2$ and which has the radii $r_3$, $r_4$ and the thickness $d_3$. A large air space $d_4$ separates this lens from the positive front component $L_3$ of group II (radii $r_5$, $r_6$ and thickness $d_5$) which is separated by a small air space $d_6$ from a second positive component $L_4$. The latter, having radii $r_7$, $r_8$ and thickness $d_7$, is a strongly curved collective meniscus whose concave side faces the diaphragm space, designated $d_8$, which separates it from the biconcave third member $L_5$ of this group having radii $r_9$, $r_{10}$ and thickness $d_9$. The last component, separated from lens $L_5$ by an air space $d_{10}$, is a compound member consisting of a meniscus-shaped lens $L_6$ (radii $r_{11}$, $r_{12}$ and thickness $d_{11}$) cemented onto a biconvex lens $L_7$ (radii $r_{12}$, $r_{13}$ and thickness $d_{12}$).

Numerical values for the radii, thicknesses and lens spacings, based upon a focal length of numerical value 100, as well as for the refractive indices $n_d$ and the Abbé numbers $v$ of the individual components $L_1$–$L_7$ of a preferred embodiment, having an image distance of 130.36, an aperture ratio of 1:4 and an angle of view of about 75°, are given in the following table:

|   |   |   |   | $n_d$ | $v$ |
|---|---|---|---|---|---|
| I | $L_1$ | $r_1 = +101.14$ | $d_1 = 4.94$ | 1.6228 | 56.9 |
|   |   | $r_2 = + 56.47$ | $d_2 = 12.79$ | air space |   |
|   | $L_2$ | $r_3 = +146.22$ | $d_3 = 4.80$ | 1.6230 | 58.1 |
|   |   | $r_4 = + 65.26$ | $d_4 = 45.05$ | air space |   |
| II | $L_3$ | $r_5 = +110.07$ | $d_5 = 16.53$ | 1.6261 | 39.1 |
|   |   | $r_6 = -188.08$ | $d_6 = 0.53$ | air space |   |
|   | $L_4$ | $r_7 = + 51.35$ | $d_7 = 6.80$ | 1.4707 | 67.2 |
|   |   | $r_8 = +173.06$ | $d_8 = 15.97$ | diaphragm space |   |
|   | $L_5$ | $r_9 = -105.23$ | $d_9 = 3.85$ | 1.6990 | 30.1 |
|   |   | $r_{10} = + 56.09$ | $d_{10} = 4.48$ | air space |   |
|   | $L_6$ | $r_{11} = +210.09$ | $d_{11} = 3.19$ | 1.6727 | 32.2 |
|   | $L_7$ | $r_{12} = +141.28$ | $d_{12} = 11.21$ | 1.6779 | 55.3 |
|   |   | $r_{13} = - 55.60$ |   |   |   |
|   |   |   | $d_{total} = 130.14$ |   |   |

As will appear from the table, the total physical length $d_{total}$ of the system has a numerical value of 130.14, being thus approximately equal to the image distance given above and exceeding the value of 125 which represents five-fourths of the overall focal length. Also, the air space $d_4$ between the two groups I and II is approximately equal to one-third of this total physical length. The refractive index of biconcave lens $L_5$ is about 1.47, thus less than 1.50; the refractive indices of lenses $L_6$ and $L_7$ have a sum of about 3.35, thus greater than 3.3, and a difference of approximately 0.005, thus less than 0.01. This satisfies the aforestated criteria for optimum performance of an objective system according to the invention.

I claim:

1. An optical objective system comprising a dispersive front lens group, consisting of two air-spaced negatively refractive menisci with rearwardly facing concavities, and a collective rear lens group, consisting of four air-spaced components including a positive forward component, a second positive component back of said forward component, a biconcave lens member back of said second positive component and a third positive component back of said biconcave member, said second positive component being a collective meniscus having two distinctly curved faces and turning its concave face toward said biconcave member, said collective meniscus having a refractive index for the yellow helium line at most equal to substantially 1.50, said third positive component consisting of two lenses cemented together, the more forwardly positioned one of said cemented lenses having the greater refractivity, said cemented lenses having indices of refraction whose sum is at most equal to substantially 3.3 and whose difference is substantially not more than 0.01, the sum of the thicknesses and air spacings of the components of both of said groups being approximately equal to the image distance of the system, said image distance being substantially not less than five-fourths of the overall focal length of the system and being approximately equal to three times the spacing between the second negatively refractive meniscus of said front group and the positive forward component of said rear group.

2. A system according to claim 1, having an overall focal length of numerical value 100, an aperture ratio of 1:4 and an image distance of substantially 130.36, wherein the radii $r_1$, $r_2$ and the thickness $d_1$ of the first negative meniscus $L_1$ of said front group, the spacing $d_2$ thereof from the second negative meniscus $L_2$ of said front group, the radii $r_3$, $r_4$ and the thickness $d_3$ of said second negative meniscus, the spacing $d_4$ of said second negative meniscus from the positive forward component $L_3$ of said rear group, the radii $r_5$, $r_6$ and the thickness $d_5$ of said forward component, the spacing $d_6$ of said forward component from the second positive component $L_4$ of said rear group, the radii $r_7$, $r_8$ and the thickness $d_7$ of said second positive component, the spacing $d_8$ of said second positive component from said biconcave member $L_5$, the radii $r_9$, $r_{10}$ and the thickness $d_9$ of said biconcave member, the spacing $d_{10}$ of said biconcave member from the third positive component of said rear group, the radii $r_{11}$, $r_{12}$ and the thickness $d_{11}$ of the front cemented lens $L_6$ of said third positive component, the radii $r_{12}$, $r_{13}$ and the thickness $d_{12}$ of the rear cemented lens $L_7$ of said third positive component, and the refractive indices $n_d$ and Abbé numbers $v$ of all components $L_1$ through $L_7$ have numerical values substantially as given in the following table:

|  |  |  | $n_d$ | $v$ |
|---|---|---|---|---|
| $L_1$ | $r_1=+101.14$ | $d_1=4.94$ | 1.6228 | 56.9 |
|  | $r_2=+56.47$ | $d_2=12.79$ | air space |  |
| $L_2$ | $r_3=+146.22$ | $d_3=4.80$ | 1.6230 | 58.1 |
|  | $r_4=+65.26$ | $d_4=45.05$ | air space |  |
| $L_3$ | $r_5=+110.07$ | $d_5=16.53$ | 1.6261 | 39.1 |
|  | $r_6=-188.08$ | $d_6=0.53$ | air space |  |
| $L_4$ | $r_7=+51.35$ | $d_7=6.80$ | 1.4707 | 67.2 |
|  | $r_8=+173.06$ | $d_8=15.97$ | diaphragm space |  |
| $L_5$ | $r_9=-105.23$ | $d_9=3.85$ | 1.6990 | 30.1 |
|  | $r_{10}=+56.09$ | $d_{10}=4.48$ | air space |  |
| $L_6$ | $r_{11}=+219.09$ | $d_{11}=3.19$ | 1.6727 | 32.2 |
| $L_7$ | $r_{12}=+141.28$ | $d_{12}=11.21$ | 1.6779 | 55.3 |
|  | $r_{13}=-55.60$ |  |  |  |

References Cited in the file of this patent

UNITED STATES PATENTS

| 1,863,099 | Bowen | June 14, 1932 |
| 1,910,492 | Mellor | May 23, 1933 |
| 2,033,596 | Sussman | Mar. 10, 1936 |
| 2,649,022 | Angenieux | Aug. 18, 1953 |
| 2,696,758 | Angenieux | Dec. 14, 1954 |

FOREIGN PATENTS

| 1,111,439 | France | Oct. 26, 1955 |